Jan. 31, 1928.                    1,657,680
E. H. LORENZ
APPARATUS FOR HANDLING GLASSWARE
Filed Jan. 29, 1926
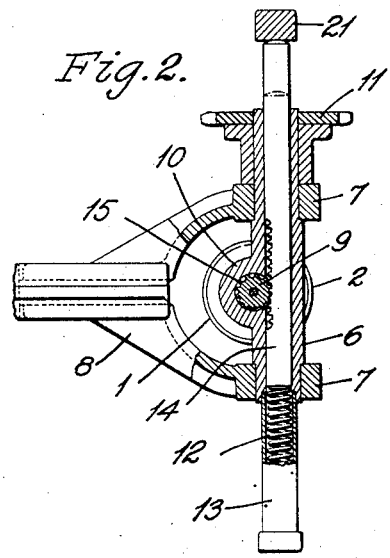
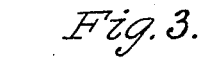
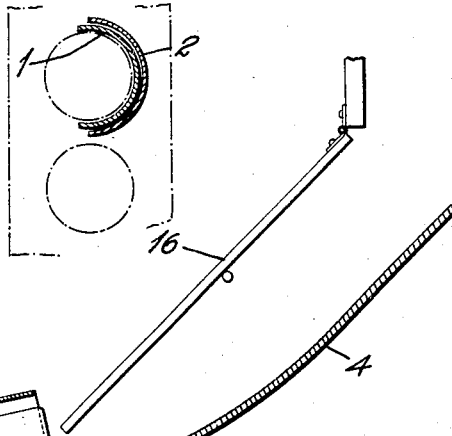
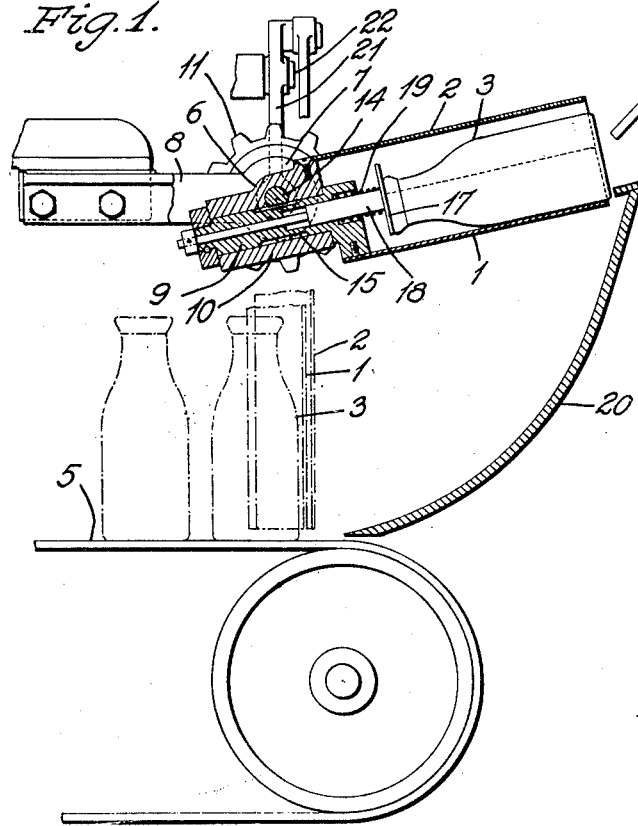
Inventor:
Edward H. Lorenz
By Robert A Brown
Atty.

Patented Jan. 31, 1928.

1,657,680

UNITED STATES PATENT OFFICE.

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR HANDLING GLASSWARE.

Application filed January 29, 1926. Serial No. 84,731.

This invention relates to apparatus for handling glassware and it has particular relation to apparatus known as setting up devices employed for receiving ware delivered from a shaping machine and depositing it upon a buck or upon a lehr conveyor.

One of the objects of the present invention is to provide a device, of the character described, that is particularly adapted to receive bottles delivered in a neck-down position from a shaping machine or other apparatus and to deposit the bottles in a right-side-up position upon the conveyor of a lehr or other conveyor, located at a level below the level at which the bottles are delivered to the setting-up device.

Another object of the invention is to provide a device of the type described that is simple in construction and operation and one that may be employed together with other similar devices to function as a stacker in arranging ware in closely spaced rows transversely across the conveyor of a lehr or buck disposed at an angle to the direction of travel of the bottle in which the bottles are conveyed away from the shaping machine.

Other objects will appear from the following description and the appended claims.

In the accompanying drawing:

Figure 1 is a vertical longitudinal sectional view through a setting-up device constructed in accordance with the invention;

Fig. 2 is an axial horizontal section through the device shown in Fig. 1;

Fig. 3 is a detailed sectional view through the elements of the holder, showing them in closed position; and Fig. 4 is a similar view illustrating the elements of the holder in open position.

Referring to the drawings, a setting up device constructed in accordance with the invention is shown as comprising a supporting member 1 and a retaining member 2, which together function as a holder in receiving a bottle 3 delivered in a neck-down position from a trough or chute 4 and in depositing the bottle in an upright position upon a buck or lehr conveyor 5. The chute 4 may conduct the bottles to the holder from a bottle-shaping machine or other apparatus located at a higher elevation than the holder.

The retaining member 2 of the holder is fixed to a horizontal rock-sleeve 6 which is journaled in bearings 7 carried by a bifurcated bracket 8. The supporting member 1 of the holder is fixed to a rock shaft 9 which is journaled in a bearing 10 carried by and extending transversely to the sleeve 6.

As shown in Fig. 1, the members 1 and 2 are swung between the position shown in full lines, in which it is in operative alignment with the chute 4 and that shown in dot-and-dash lines, in which it is substantially perpendicular to the conveyor 5, in order to periodically transfer bottles from the chute 4 to the conveyor 5, by means of a sprocket wheel 11 which is fixed to the sleeve 6 and which may be oscillated by any preferred mechanism, not shown.

The supporting member 1 is yieldably urged toward a position in which it and the member 2 will form a cylindrical cup or holder, as shown in full lines in Figs. 1 and 3, by a spring 12 which is contained in a tubular casing 13 fixed to one end of the sleeve 6 and disposed in axial alignment therewith. This spring bears against one end of a rack bar 14 which is slidably mounted in the sleeve 6 and which meshes with gear teeth 15 formed in the rock shaft 9.

A bottle, upon reaching the lower end of the chute 4, first frictionally engages a hinged plate 16 which retards its movement. The bottle upon entering the holder engages a shock absorbing stop 17 comprising a plunger 18 which is slidably mounted in the rock shaft 9 and which is yieldably urged outwardly by a spring 19.

As soon as the bottle enters the holder, the plate 16 drops behind the bottle, preventing it from rebounding out of the holder, and the sleeve 6 is rocked about its axis by the sprocket wheel 11. This movement of the sleeve 6 swings the holder to the position shown in dot-and-dash lines in Fig. 1 and deposits the bottle in a neck-up position on the conveyor 5. During this movement, the bottom of the holder moves adjacent to a stationary arcuate plate 20 which prevents the bottle from falling out of the holder during its transfer and reversion.

As soon as the bottle is deposited upon the conveyor 5, the member 2 is rotated to the position shown in dot-and-dash lines in Fig. 1 and in full lines in Fig. 4, so as to permit the movement of the conveyor 5 to carry the bottle out of the holder. This is accomplished by a bell crank lever 21 which is pivotally mounted upon a stud 22 and which is actuated by any suitable mechanism so as to force the rack bar 6 against the action of the spring 12 and impart a one-half rotation to the rock shaft 9 and the holder member 2 carried thereby.

The holder is then returned to its full-line position in alignment with the trough 4 to receive the next succeeding bottle and the member 2 is rotated back to its initial position wherein it completes the cylindrical form of the holder, under the action of the spring 12 and the retraction of the lever 21.

It will be observed that the lateral withdrawal of the member 2 from operative engagement with the bottle permits the bottles to be spaced very closely on the conveyor, whether the conveyor is disposed in line with the chute as in Fig. 1 or at an angle thereto as indicated in Fig. 4.

The rate of movement and the timing of the parts may be controlled so as to operate in synchronism with the shaping machine by any suitable mechanism.

The illustrated embodiment of the invention may be modified in construction and arrangement without departing from the invention as set forth in the appended claims. For example, the device may be employed to receive bottles discharged from the molds of a shaping machine in an inverted position and to deposit it in an upright position upon a table from which it may be transferred to a lehr by take-out buoys or by a mechanical stacking device. Furthermore, it will be understood that the rotating member 1 of the holder need not necessarily be the member that supports the bottle during its transfer, for the reason that should the conveyor extend in a direction opposite to that shown in Fig. 1, the positions of the members 1 and 2 would be reversed so as to clear the bottle quickly when it commences to move on the conveyor.

What I claim as my invention is:

1. The combination with a chute and a conveyor, of a transferring means comprising a member movable between a position in alignment with said chute and a position substantially perpendicular to said conveyor for transferring articles of glassware from the former to the latter, and means for moving said member from a position in front of the ware on said conveyor to a position to the rear thereof after it has been deposited on said conveyor.

2. The combination with a chute and a conveyor located at different levels, of a transferring device comprising a multi-part housing mounted for oscillation between a position in alignment with said chute and a position substantially perpendicular to said conveyor for transferring a bottle from the former to the latter, and means for retracting a part of said housing laterally out of the path of said bottle.

3. Apparatus for handling glassware, comprising a casing mounted to oscillate about a horizontal axis between a ware-receiving station and a ware-delivery station to transfer inverted ware from the former to the latter and revert the ware during such transfer, said casing embodying a pair of complementary semi-cylindrical sections, and means for rotating one of said sections about an axis extending transversely to the axis of oscillation thereof to a nested position within the other and out of operative engagement with the ware.

4. Apparatus for handling glassware, comprising a casing mounted to oscillate about a horizontal axis between a ware-receiving station and a ware-delivery station to transfer inverted ware from the former to the latter and revert the ware during such transfer, said casing embodying a pair of complementary semi-cylindrical sections, means for rotating one of said sections about an axis extending transversely to the axis of oscillation thereof to a nested position within the other and out of operative engagement with the ware, and means for supporting the bottom of the ware during the transferring operation.

5. The combination with a chute and a conveyor, of transferring means for receiving a bottle delivered in a neck-down position by said chute and depositing it in a neck-up position on said conveyor, and means for removing said transferring means laterally out of the path of said bottle when upon said conveyor.

6. The combination with a chute and a conveyor located at different levels, of a transfer device for receiving a bottle delivered in a neck-down position by said chute and depositing it in an upright position on said conveyor, and means for retracting a portion of said device laterally out of the path of said bottle.

7. The combination with a chute and conveyor, of a member mounted to oscillate between said chute and said conveyor to transfer glassware from the former to the latter, and means for moving said member about an axis substantially coincident with that of the ware to a position without the path of travel of the ware on said conveyor.

8. The combination with a chute and a conveyor, of a holder mounted to oscillate between the chute and the conveyor to transfer glassware from the former to the latter, and means for moving a portion of said holder about the vertical axis of the ware to a position without the path of travel of the ware on said conveyor.

9. The combination with a chute and a conveyor, of a holder mounted to swing about a horizontal axis between the chute and the conveyor to transfer glassware from the former to the latter, and means for moving a portion of said holder about an axis extending in a direction transverse to that of the axis of swing of said holder to a position without the path of travel of the ware on the conveyor.

10. The combination with a chute and a conveyor, of a holder mounted to oscillate between said chute and said conveyor to transfer glassware delivered in a neck-down position by the former to an upright position on the latter, and means for moving a portion of said holder about the ware to a position without the path of travel of the ware on the conveyor.

11. The combination with a chute and a conveyor, of transferring means for receiving a bottle delivered in a neck-down position by said chute and depositing it in a neck-up position on said conveyor, means for removing said transferring means laterally out of the path of said bottle when upon said conveyor, and means for preventing displacement of the ware from the holder during the transfer thereof.

12. The combination with a chute and a conveyor, of transferring means for receiving a bottle delivered in a neck-down position by said chute and depositing it in a neck-up position on said conveyor, means for removing said transferring means laterally out of the path of said bottle when upon said conveyor, and means mounted adjacent to the lower end of said chute for retarding the movement of the ware as it enters said holder.

13. The combination with a chute and a conveyor, of transferring means for receiving a bottle delivered in a neck-down position by said chute and depositing it in a neck-up position on said conveyor, means for removing said transferring means laterally out of the path of said bottle when upon said conveyor, and means carried by said holder for yieldably arresting the movement of the ware when it enters said holder.

14. The combination with a chute and a conveyor, of a holder mounted to oscillate between said chute and said conveyor to transfer ware delivered in a neck-down position by the former to a neck-up position upon the latter, said holder comprising two complementary semi-cylindrical members, and means for rotating one of said members to a nested position within the other and without the path of movement of the ware on said conveyor.

15. The combination with a chute and a conveyor, of a transfer device comprising a horizontal sleeve, a shaft mounted in said sleeve and extending transversely thereof, a gear on said shaft, a rack bar slidably mounted in said sleeve for intermeshing engagement with said gear, a holder embodying a pair of cooperating substantially semi-cylindrical members, one of said members being fixed to said sleeve and the other of said members being fixed to said shaft, means for oscillating said sleeve to move said holder between a position in operative alignment with said chute and a position substantially vertical to said conveyor to transfer bottles delivered by said chute to said conveyor, and means for actuating said rack bar to rock said shaft and rotate said supporting member into a nested position within said retaining member and without the path of travel of the bottle on said conveyor.

16. The combination with a chute and a conveyor, of a sectional holder mounted to oscillate about a horizontal axis between a position in operative alignment with said chute and a position substantially perpendicular to said conveyor to transfer a bottle from said chute to said conveyor, and means for moving one of the sections of said holder about an axis substantially parallel to that of said bottle to a position without the path of travel of said bottle on said conveyor.

Signed at Hartford, Conn., this 26th day of January, 1926.

EDWARD H. LORENZ.